April 8, 1930.  J. M. SMYGEL  1,753,727
POWER TAKE-OFF
Filed April 20, 1929   3 Sheets-Sheet 1

INVENTOR.
J. M. Smygel
BY
Watson E. Coleman ATTORNEY.

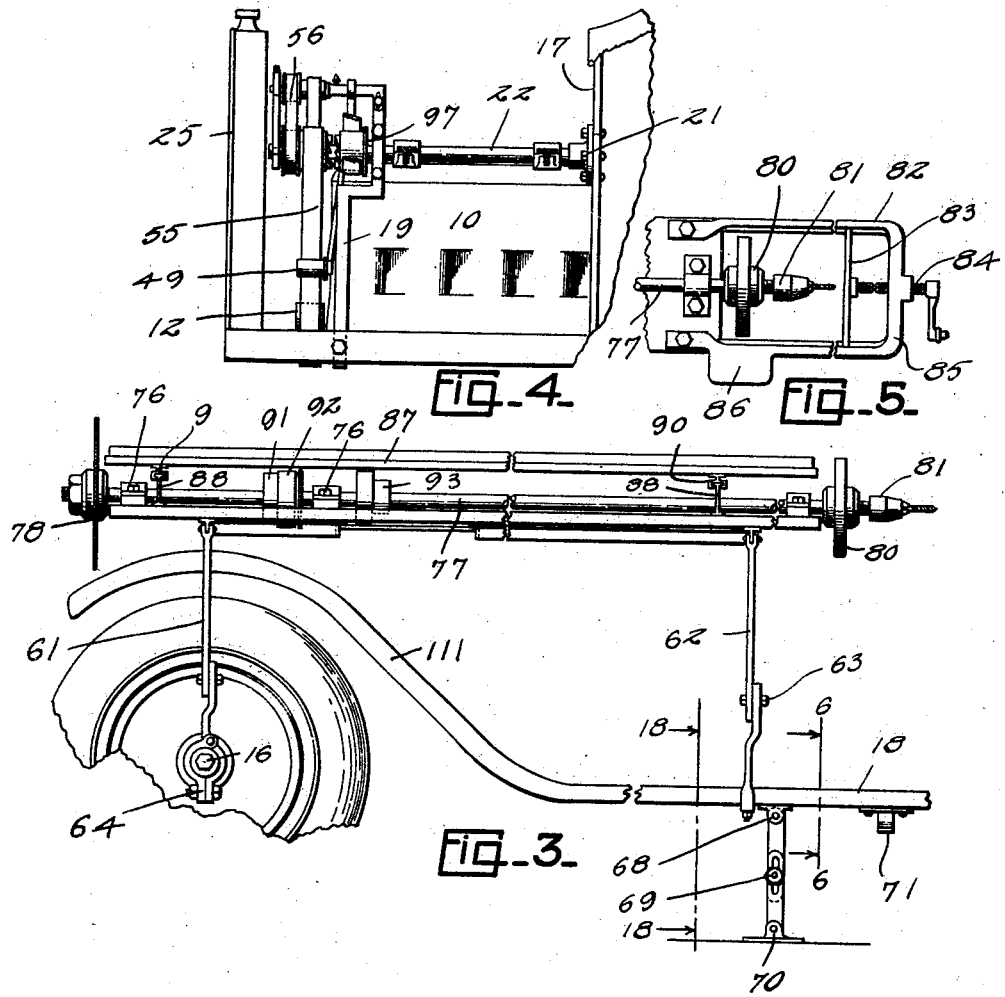

April 8, 1930. J. M. SMYGEL 1,753,727
POWER TAKE-OFF
Filed April 20, 1929  3 Sheets-Sheet 3
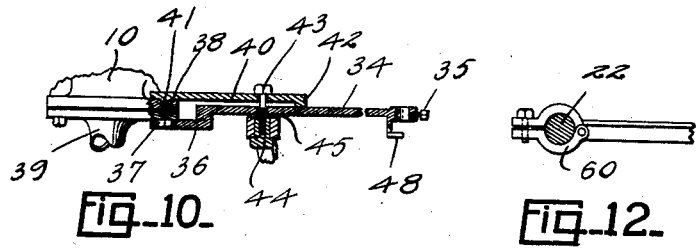
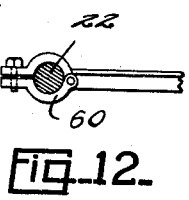
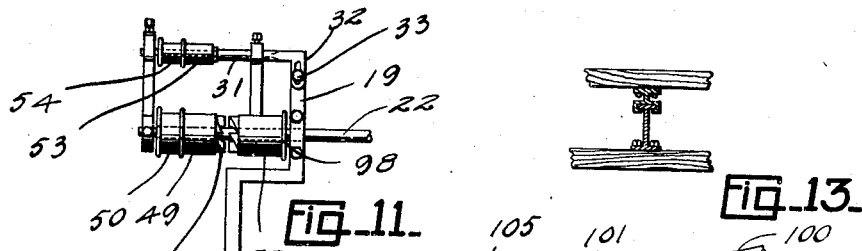
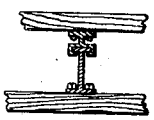
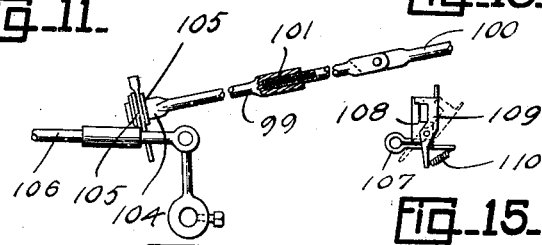
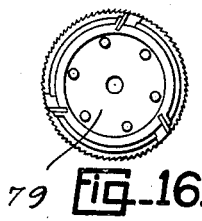
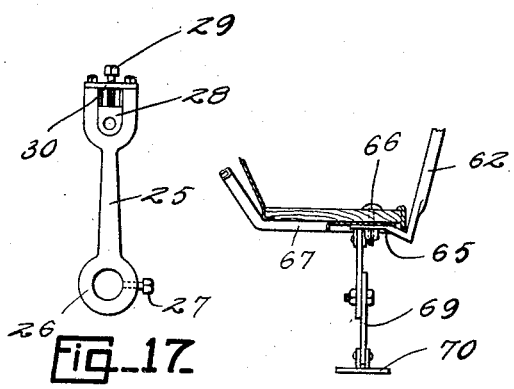
INVENTOR.
J. M. Smygel
BY
Watson E. Coleman ATTORNEY.

Patented Apr. 8, 1930

1,753,727

UNITED STATES PATENT OFFICE

JOSEPH M. SMYGEL, OF ST. JOSEPH, MISSOURI

POWER TAKE-OFF

Application filed April 20, 1929. Serial No. 356,698.

This invention relates to power takeoffs for use with automobiles and more particularly to an apparatus of this character making provision for operation of a fairly extensive shop equipment driven by the power plant of an automobile, and supported entirely from the automobile.

An important object of the invention is the provision of a novel and improved work table structure detachably supported from the vehicle and in turn supporting power takeoff shafts, control mechanism for the engine, and tools and other accessories which may be either operated directly by the power takeoff shaft, or driven from this shaft.

A further object of the invention is to provide in apparatus of this character an arrangement such that portions of the mechanism may be permanently associated with the engine and chassis frame of the vehicle, and may be housed under the hood when the remaining elements of the takeoff are detached therefrom, so that the normal appearance of the vehicle is in no way altered.

A further object of the invention is to provide an arrangement of this character which derives its power takeoff from the fan driving pulley of the engine without interfering with the driving of the fan belt, and which provides an arrangement such that the fan belt may be tensioned at any time when the same becomes slack.

These and other objects I attain by the construction shown in the accompanying drawings wherein for the purpose of illustration I have shown a preferred embodiment of my invention and wherein:—

Figure 3 is a side elevation of the bed showing the manner of connecting the same to the vehicle;

Figure 4 is a sectional view on line 4—4 of Figure 2;

Figure 5 is a fragmentary plan view of the rear end of the table illustrating a drilling and grinding attachment;

Figure 6 is a sectional view on line 6—6 of Figure 3;

Figure 7 is a fragmentary plan view of the clamping element engaged with the throttle control rod of the vehicle;

Figure 8 is a side elevation of an auxiliary control device showing it engaged in the supporting bearing of the bed;

Figure 9 is a front elevation of the control rod receiving bearing;

Figure 10 is a longitudinal sectional view through the engine engaging brace;

Figure 11 is a front elevation of the forward support of the main brace showing the pulley arrangement employed;

Figure 12 is a sectional view through the main brace showing the connection of one of the clamping arms of the bed;

Figure 13 is a detailed sectional view showing the mounting of the slide upon the bed;

Figure 14 is a detailed side elevation partially in section showing the method of connecting the auxiliary control rod to the clamping bracket applied to the throttle rod of the engine;

Figure 15 is an end elevation of the clamping bracket detached;

Figure 16 is an end elevation of a dado head for use with the control apparatus;

Figure 17 is an elevational view of the adjusting and supporting arm;

Figure 18 is a section on line 18—18 of Figure 3.

Figure 1:
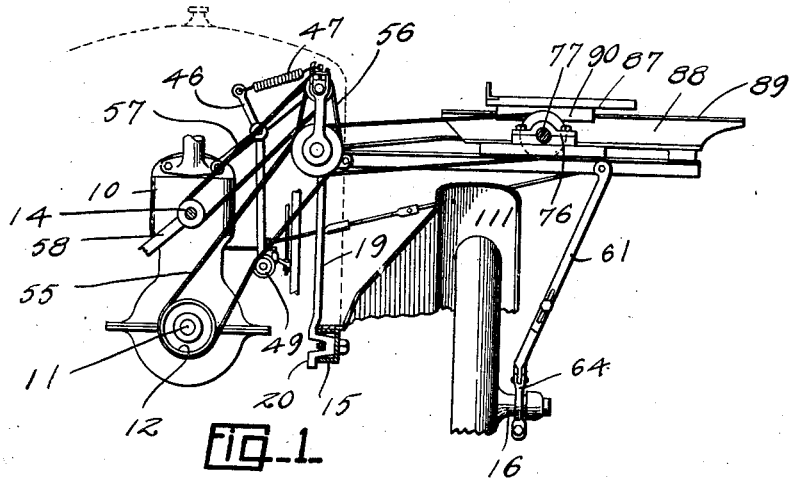
Figure 1 is a fragmentary front elevation partially in section showing a power takeoff constructed in accordance with my invention, applied to an automobile, the dotted lines indicating the outline of the hood and the radiator.
Figure 2:
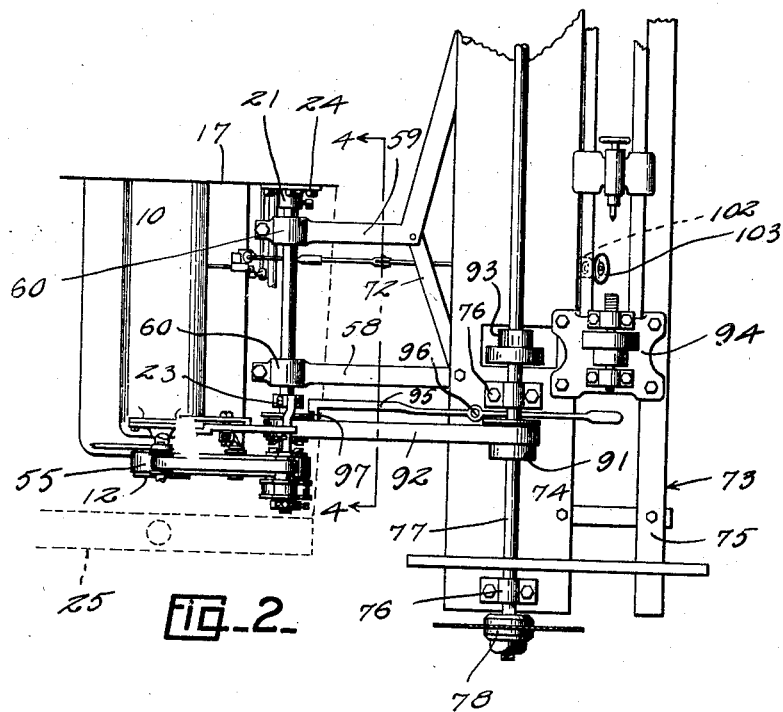
Figure 2 is a plan view showing the apparatus applied, the dotted lines indicating the outlines of the hood and radiator.

Referring now more particularly to the drawings, the numeral 10 generally designates the engine of an automobile, 11 the crank shaft thereof, 12 a pulley secured to the crank shaft at the forward end of the engine, 14 the fan driving pulley, 15 a side member of the chassis frame, 16 the hub of a front wheel of the vehicle, 17 the dashboard of the vehicle, and 18 the running board of the vehicle. The elements above referred to may all constitute normal parts of the vehicle as produced by the manufacturer and form no portion of my invention except in their cooperation with the elements hereinafter described.

In accordance with my invention, I provide an upright support 19, the lower end of which has an offset portion 20 adapted to extend into and be secured in position in the channel of the side frame member 15. Upon the dashboard I secure a socket 21 receiving the rear end of a shaft 22, which adjacent its forward end projects through and is clamped to the upright support 19 adjacent the upper end thereof. Shaft 22 is maintained against rotation by the clamp 23 of standard 19 and by set screw 24 directed through the wall of socket 21. Upon the outer end of shaft 22 I mount an arm 25, more clearly shown in Figure 17. This arm at its lower end has an apertured hub 26 through which shaft 22 passes, and through the wall of which a set screw 27 is directed for securing the arm in rotatably adjusted positions upon shaft 22.

The upper end of this arm is provided with a vertically shiftable bearing element 28, which is engaged by one end of a set screw 29 extending longitudinally of the arm. This set screw is threaded through a support 30 carried by the arm so that when the set screw is rotated, bearing 28 may be adjusted longitudinally of the arm to a desired position.

In this bearing is engaged one end of a shaft 31, the opposite end of which has an angular portion 32 which is slotted and abuts the upper end of standard 19. A bolt 33 directed through the slot serves to secure this end of the shaft in vertically adjusted positions.

Shaft 31 is embraced by one end of brace arm 34, which may be secured to the shaft by a set screw 35 or the like. The opposite end of this arm is offset outwardly as at 36, and socketed at 37, for the reception of the head 38 of a bolt forming a portion of the normal structure of the engine. In the present instance this bolt is shown as one of the bolts employed in securing the water connection 39 to the engine 10. Associated with this arm is a clamping arm 40, one end of which is provided with a lug 41 adapted to enter the bolt opening of the engine casting, the opposite end of which is provided with a pivot lug 42 to engage against the face of brace 34. Intermediate its ends, it is apertured for the passage of a bolt 43, which extends through brace 34 and engages in a shoulder nut 44, a washer 45 being disposed between the inner or smaller end of this nut and the arm 34. Pivoted upon the smaller portion of the nut is a lever 46, the upper end of which is connected by a spring 47 with a hook 48 upon the upper end of brace 34 and the lower end of which has mounted thereon an idler roller 49.

Rotatably mounted upon shaft 22 between the standard 19 and arm 25, is a double pulley, the elements of which are indicated at 49 and 50, respectively. The inner end of element 49 is formed as one jaw clutch 51, for coaction with the second element carried by the outer end of a second pulley 52, rotatably mounted upon the shaft 22.

Upon shaft 31 above the double pulley of shaft 22, I rotatably mount a double pulley, the elements of which are designated at 53 and 54, respectively. The element 49 of the double pulley of shaft 22 is connected with the pulley 12 of the engine crank shaft by a belt 55. The elements 50 and 54 of the double pulleys of shaft 22 and 31 are connected by a belt 56, while the element 53 of the double pulley of shaft 31 is connected with the fan drive pulley by a bolt 57. The fan drive pulley 14 is mounted upon the usual adjustable arm 58, permitting the removal of slack from belt 57. Slack of belt 56 may be removed by adjustment of the shaft 31 away from shaft 22, and slacking of the belt 55 is prevented by engagement of idler roller 49 therewith and the constant tension placed on this belt through spring 47 and lever 46.

The mechanism just described, while susceptible to removal from the vehicle, may conveniently be left in position thereof and used within the hood of the engine (not herein shown). Of this mechanism the pulley 52 which is shiftable longitudinally of shaft 22 to engage the elements of the clutch 51, constitutes the power takeoff pulley, as will hereinafter more fully appear.

In combination with this structure, I provide a removable frame including spaced front and rear arms 58 and 59. These arms, which may be conveniently formed from T beams, each have at their inner end a clamp 60 to engage the shaft 22, and have pivoted thereto, adjacent their outer ends, extensible braces 61 and 62, respectively. Each brace is at present shown as formed in two sections connected by a bolt 63 operating in slots formed in the adjacent ends of the sections.

The lower end of brace 61 is provided with a clamp 64 to engage the hub 16 of the front wheel, while the brace 62 has at its lower end an angular extension 65 adapted to project beneath the running-board and be secured thereto by one of the bolts 66 employed in securing the running-board to its supporting brackets 67. In order that the running-board may be rigidified, I preferably pivot to the lower end of this running-board as at 68, an extensible leg 69 having pivoted to the lower end thereof, a ground engaging foot 70. This leg when not in use may be swung upwardly into parallel relation with the running-board of the vehicle and may be held in this position by a spring clamp generally designated at 71. Arms 58 and 59 are preferably connected by a longitudinally extending brace 72, and the arm 59 preferably angles rearwardly so that it may increase the effective length of the support provided between the outer ends of these arms. Mounted upon the support produced by the outer ends of arms 58 and 59, is bed 73 preferably comprising a wide inner bed plate 74, and a narrow outer bed plate 75, adjacent ends of which are in spaced relation to one another. The wider bed plate 74 has mounted thereon longitudinally spaced bearings 76 in which is rotatably mounted a shaft 77. One end of this shaft is constructed to permit the mounting of saw arbors 78 or a dado head 79 and the opposite end thereof preferably mounts a grinding wheel 80 and a drill chuck 81.

The corresponding end of the bed plate 74 may conveniently have mounted thereon a supporting bracket in the form of a U-shaped frame, the ends of the arms 82 of which are secured to the bed plate. The inner faces of these arms have slidably engaged therewith a pressure plate 83, which may be adjusted longitudinally of the arms by a lever screw 84 engaged therewith and threaded through the arm connection 85.

The outer arm has a relatively wide portion 86 in opposition to the grinding wheel, forming a grinding rest. The bed has mounted thereon a carriage 87, this carriage being at present shown as supported from the bed by transversely extending slides 88 in the form of I beams, the head flanges 89 of which are embraced by slide yokes 90 secured to the under face of the carriage. Upon this carriage material may be supported while it is being fed to the saw or dado, or to the grinding wheel.

Shaft 77 has secured thereto a pulley 91 adapted to be connected by a belt 92 with the pulley 52 of shaft 22. A further pulley, preferably of the step type, as indicated at 93, is mounted upon this shaft to provide for an additional drive takeoff, which may be conveniently employed in operating a lathe 94 carried by the bed.

The bed further supports means for controlling the engagement of the jaw clutch 51 and for controlling the speed of the engine. In the present instance, the control for the jaw clutch is shown as comprising a lever 95, pivoted to the wider bed element adjacent the inner edge thereof, as indicated at 96, and having its inner end provided with a notch 97 to receive a flange 98 formed on one end of pulley 52. Pivot 96 is so located that this lever, when disengaged from the pulley, may be swung to a position longitudinal to the bed, so that it does not interfere with storage thereof.

The means for controlling the speed of the engine are at present shown as comprising a bisectional rod, the adjacent ends of sections 99 and 100 of which have threaded engagement with one another at 101. The section 100 is rotatably mounted in a bearing 102, carried by the bed and has at its upper end an operating wheel or handle 103. The section 99 has its free end flattened as at 104, and provided with longitudinally spaced stops 105.

Upon the carbureter control rod 106 of the engine, I mount a bracket including a clamping sleeve 107 to embrace this rod and clamp thereto, said sleeve having an upstanding latch bracket 108. Pivoted to the latch bracket is a latch element 109 combining with this bracket when in latching position to produce a rectangular opening through which the flattened portion 104 of section 99 may be extended with the stop elements 105 arranged at opposite sides of the bracket and latch. Latch 109 is maintained in its latching position by a spring 110 and may be readily operated to engage or disengage the carbureter control rod.

It will be obvious that by rotating this control rod, longitudinal adjustment of the carbureter rod 106 of the engine may be obtained and accordingly the speed of the engine may be regulated. When it is desired to transport the device from place to place, the apparatus may be simply left in its normal position with the exception of the brace 61, which may be released from the wheel hub and swung upwardly. Removal of the brace allows the forward end of the bed to sag downwardly from a point where it will be supported by the mud guard 111 of the vehicle.

If desired, the carbureter control rod of the attachment may be disengaged from the carbureter control rod of the engine, the clamps 60 released, belt 92 may be removed, and braces 61 and 62 disengaged from the vehicle then the bed may be removed as a unit, and the hood of the engine placed in its usual position.

It will be obvious that the construction employed is capable of a very considerable range of change and modification without in any manner departing from the spirit of the invention, and I accordingly do not limit myself to such specific structure except as hereinafter claimed.

I claim:—

1. In a power takeoff for use with engines of automobiles and in combination with a chassis frame, dash and engine of an automobile, supports mounted on the chassis frame and dash, said dash support comprising a socket member adapted to be mounted on the dash, a shaft mounted in said supports, a driving element mounted thereon, and means for connecting said driving element with the engine to be driven thereby.

2. In a power takeoff for use with the engines of automobiles which have the usual chassis frame, dash, engine, and hood for enclosing the engine, supports mounted on the chassis frame and dash, said dash support comprising a socket member adapted to be mounted on the dash, a shaft mounted therein, a driving element mounted thereon, and means for connecting said driving element to the engine to be driven thereby, all of said elements lying within the confines of the hood.

3. In a power takeoff for use with the engines of automobiles and in combination with a chassis frame, dash and engine of an automobile, the engine having the usual crank shaft, pulley and fan belt pulley which are normally connected by a driving belt, of a socket carried by the dash, a standard arising from the chassis frame, a shaft engaged in said socket and supported by said standard, a second shaft vertically adjustably connected with the upper end of the standard and paralleling the first named shaft, double pulleys on the first and second named shafts having corresponding elements thereof connected by a belt, a driving connection between the second element of one of said pulleys and the crank shaft pulley of the engine, a driving connection between the second element of the other of said pulleys and a fan belt pulley of the engine, and a power takeoff pulley having clutching connection with one of said pulleys.

4. In combination with an automobile having the usual engine housing, front wheels and running board, a support within the engine housing, a bed having arms projecting inwardly and provided at their inner ends with means to detachably engage said support, braces pivoted to said bed, and means at the lower ends of said braces whereby to detachably engage the hub of a front wheel and said running board.

5. In combination with an automobile having the usual engine housing, front wheels and running board, a support within the engine housing, a bed having arms projecting inwardly and provided at their inner ends with means to detachably engage said support, braces pivoted to said bed having means at their lower ends to detachably engage the hubs of a front wheel and said running board, a shaft mounted in bearings carried by said bed, and means for connecting said shaft to the engine of the automobile to be driven thereby.

6. A device as claimed in claim 4 wherein there is a shaft rotatably mounted upon the bed, a member rotatably mounted upon the support and having driving connection with the shaft of the bed, and means are provided for driving said member from the engine.

7. In combination with an automobile having the usual engine housing, front wheels and running board, a support within the engine housing, a bed having arms projecting inwardly and provided at their inner ends with means to detachably engage said support, braces pivoted to said bed having means at their lower ends to detachably engage the hub of a front wheel and said running board, and a pivoted extensible brace carried by the running board and adapted to be swung into engagement with the ground.

8. A device as claimed in claim 4 wherein the bed is provided with a shaft driven from the engine of the vehicle, and means are provided at the bed and engaged with the controls of the engine for regulating the speed of the engine.

In testimony whereof I hereunto affix my signature.

JOSEPH M. SMYGEL.